(12) United States Patent
Neubeck et al.

(10) Patent No.: US 12,182,119 B2
(45) Date of Patent: Dec. 31, 2024

(54) REDUNDANCY AND LOAD BALANCING

(71) Applicant: Microsoft Technology Licensing, LLC, Redmond, WA (US)

(72) Inventors: Alexander Ulrich Neubeck, Obermichelbach (DE); Gregory Scott Orzell, Mainz (DE)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/322,848

(22) Filed: May 24, 2023

(65) Prior Publication Data
US 2024/0394253 A1 Nov. 28, 2024

(51) Int. Cl.
*G06F 16/2453* (2019.01)
*G06F 16/22* (2019.01)

(52) U.S. Cl.
CPC .... *G06F 16/24542* (2019.01); *G06F 16/2272* (2019.01)

(58) Field of Classification Search
CPC ........................ G06F 16/24542; G06F 16/2272
USPC .......................................................... 707/715
See application file for complete search history.

(56) References Cited

U.S. PATENT DOCUMENTS

| | | | | |
|---|---|---|---|---|
| 2004/0263152 | A1* | 12/2004 | Ahrikencheikh | G01R 31/2801 324/754.03 |
| 2014/0330785 | A1* | 11/2014 | Isherwood | G06F 16/2458 707/640 |
| 2015/0112999 | A1* | 4/2015 | Sivasubramanian | G06F 16/21 709/204 |
| 2016/0203174 | A1* | 7/2016 | Shahane | G06F 16/2228 707/803 |
| 2018/0314750 | A1* | 11/2018 | Merriman | H04L 67/1097 |
| 2020/0042641 | A1* | 2/2020 | Zhang | G06F 16/328 |
| 2020/0133550 | A1* | 4/2020 | Willnauer | G06F 16/137 |
| 2022/0035555 | A1* | 2/2022 | Leskes | G06F 3/067 |
| 2022/0188365 | A1* | 6/2022 | Zhang | G08G 1/205 |

* cited by examiner

*Primary Examiner* — Amy Ng
*Assistant Examiner* — Antonio J Caiado
(74) *Attorney, Agent, or Firm* — Workman Nydegger (57) ABSTRACT

Methods and systems are described which use load balancing to efficiently perform queries. Embodiments identify available nodes and divide an index into shards. Embodiments distribute the index across the nodes where each node has at least two distinct shards. Based on a target upper bound number of requests per node, and based on which shards exist at each node, embodiments identify a query routing policy which also includes accounting for node failure. Embodiments route a query based on the identified query routing policy.

15 Claims, 6 Drawing Sheets

REDUNDANCY AND LOAD BALANCING

BACKGROUND

As the amount of data in a particular domain continues to grow, the ability to efficiently search for specific data within that domain is an ongoing problem. For example, for extremely large datasets, doing a simple search that iterates through every piece of data, or even an index of that data, becomes inefficient (e.g., in terms of computing and power resources consumed to perform the search) and costly (e.g., in terms of power consumption and the amount of time it takes to obtain a result).

The subject matter claimed herein is not limited to embodiments that solve any disadvantages or that operate only in environments such as those described above. Rather, this background is only provided to illustrate one example technology area where some embodiments described herein may be practiced.

BRIEF SUMMARY

In some aspects, the techniques described herein relate to a method, implemented at a computer system that includes a processor, including: identifying n available nodes; dividing an index into m shards; distributing the index across the nodes, each node having at least two distinct shards; based on a target maximum number of requests per node, and based on which shards exist at each node, identifying a query routing policy; and routing a query based on the query routing policy.

In some aspects, the techniques described herein relate to a computer system including: a processing system; and a computer storage media that stores computer-executable instructions that are executable by the processing system to at least: identify n available nodes; divide an index into m shards, where m is at least n*2; distribute the index across the nodes, each node having at least two distinct shards; based on a target maximum number of requests per node, and based on which shards exist at each node, identify a query routing policy; and route a query based on the query routing policy.

In some aspects, the techniques described herein relate to a computer program product including a computer storage media that stores computer-executable instructions that are executable by a processor system to at least: identify n available nodes; divide an index into m shards, where m is at least n*2; distribute the index across the nodes, each node having at least two distinct shards; based on a target maximum number of requests per node, and based on which shards exist at each node, identify a query routing policy, including accounting for n-i nodes, where i is a positive integer to allow for failure; and route a query based on the query routing policy.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the advantages and features of the systems and methods described herein can be obtained, a more particular description of the embodiments briefly described above will be rendered by reference to specific embodiments thereof which are illustrated in the appended drawings. Understanding that these drawings depict only typical embodiments of the systems and methods described herein, and are not therefore to be considered to be limiting of their scope, certain systems and methods will be described and explained with additional specificity and detail through the use of the accompanying drawings in which.

DETAILED DESCRIPTION

One system for searching large datasets is ELASTICSEARCH from Elastic NV of Amsterdam, the Netherlands. ELASTICSEARCH is a multitenant-capable full-text search engine that attempts to overcome the challenges of searching through large amounts of data by searching based on an index that is distributed across a plurality of search nodes. Systems that rely on ELASTICSEARCH, or similar technologies, divide a search index into a number of distinct 'shards' that each contain a non-overlapping subset of the search index (e.g., the sum of the shards equals the full search index). These systems then distribute these shards across a number of search nodes, one shard per search node. To process a query, the system routes the query to each search node, which processes the query against its corresponding shard to obtain a subset of query results. The system then aggregates these subsets of query results to obtain a complete query result.

A first example of a simple search system uses these shard-based searching techniques to divide a search index into two shards and distribute those shards to two search nodes, such that each search node comprises one of two distinct subsets of the search index. Assuming, for this first example, that each search node is fully utilized when it processes two queries against its corresponding shard, this first example system can handle two concurrent queries. Because each search node comprises only a subset of the search index, results from both search nodes are required to obtain a complete query result. This means that the failure of a single search node results in one shard not being searched when the system processes a query, leading to incomplete query results.

To ensure that shard-based search systems remain trustworthy in the event of a search node failure, additional search nodes may be added for shard replication. A second example of a larger search system divides a search index into two shards but distributes those shards to four search nodes. In this second example, each search node still includes a single shard, but each shard exists at two of the four search nodes. Assuming again that each search node is fully utilized when it processes two queries against its corresponding shard, this second example system can handle four concurrent queries. Due to shard replication, when a single node failure happens in this second example system, the system can still produce complete query results because there still exists a search node containing each shard. However, because there is only one copy of one of the two shards, and the node containing that copy can only concurrently process two queries at once, the query capacity of the second example system, as a whole, drops to two concurrent queries. This means that, in this failure scenario, the capacity of one search node is essentially wasted unless it is acceptable for half of the queries to return incomplete results.

Thus, while the use of shard-based searching techniques, such as ELASTICSEARCH, has improved search scalability, these searching techniques still are susceptible to inefficiency in the case of search node failure. As such, there is an ongoing need to provide efficient load balancing of queries across a plurality of search nodes.

At least some embodiments described herein provide efficient load balancing and redundancy that provide complete query results, even in the case of a search node failure, while reducing the amount of wasted search node resources when there is a search node failure. These embodiments rely on storing more than one shard at each search node and distributing the shards in a manner that ensures a high probability of shard availability in the event of search node failure (including multiple search node failures). For example, embodiments may assign shards to form a cycle across nodes, such that all nodes have different pairs of shards. These embodiments also use query routing optimization to reduce the waste of search node resources and maintain optimal query processing capacity in the event of search node failure.

Figure 1:
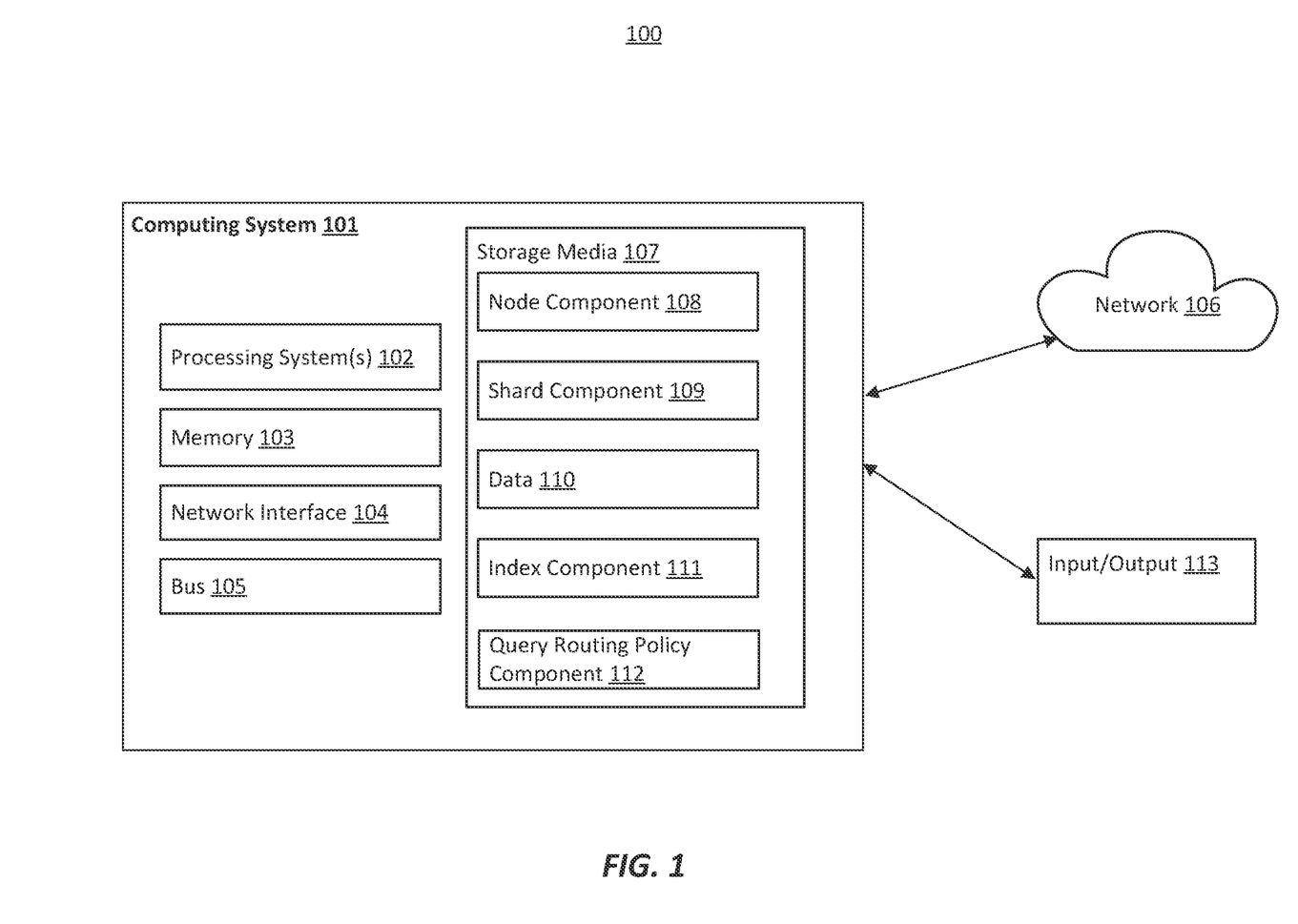
FIG. 1 illustrates an example computer architecture that facilitates a load balancing search method.

FIG. 1 illustrates an example of a computer architecture 100 that facilitates load balancing and redundancy while performing queries across a plurality of search nodes. As shown, computer architecture 100 includes a computing system 101 comprising processing system(s) 102 (e.g., a single processor or a plurality of processors), memory 103 (e.g., system or main memory), storage media 107 (e.g., a single computer-readable storage medium, or a plurality of computer-readable storage media), all interconnected by a bus 105. As shown, in embodiments, computing system 101 also includes a network interface 104 (e.g., one or more network interface cards) for forming local or wide-area network connections via network 106. Lastly, computer architecture 100 includes input/output devices 113.

Storage media 107 is illustrated as storing computer-executable instructions implementing at least a node component 108, a shard component 109, an index component 111, and a query routing policy component 112. Storage media 107 is also illustrated as also storing data 110 (e.g., any form of dataset, such as a code repository, an image repository, a literary database, etc.).

In embodiments, node component 108 determines a number of nodes to be used as search nodes (e.g., for hosting shards and processing queries against those shards) within a distributed computing system or cluster. This may be a number of nodes that are to be created within a new distributed computing system, a number of nodes that already exist within an existing distributed computing system, a total number of nodes after adding nodes to the existing distributed computing system or after removing nodes from the existing distributed computing system, etc. The number of nodes may be set manually by a user or automatically by node component 108 (e.g., based on available computing resources, based on a desired query processing capacity, based on a past or current query load, based on a number of index shards, and the like).

In embodiments, shard component 109 determines a number of shards into which to divide an index of data 110, where that number is at least double the number of nodes determined by node component 108. Shard component 109 also determines how to distribute those shards across the nodes. In one embodiment, there are exactly twice as many shards as nodes. In this embodiment, those shards are distributed so that each node contains a pairing of two shards. In other embodiments, there are at least twice as many shards as nodes, and those shards are distributed so that each node contains a grouping of two or more shards. In embodiments, shard component 109 chooses a distribution of shard groupings that is resilient to node failures. For example, shard component 109 may ensure that each shard grouping is as unique as is permitted, given the number of nodes available. In some embodiments, each node has the same number of shards. In other embodiments, the number of shards per node varies.

In embodiments, index component 111 divides an index of data 110 into the number of shards determined by shard component 109. In embodiments, index component 111 also distributes those shards across the nodes determined by node component 108 in the manner determined by shard component 109, where each node includes a grouping of two or more shards. In some embodiments, index component 111 also generates the index of data 110.

In embodiments, query routing policy component 112 creates a query routing policy that is used to determine how to route queries to the search nodes. In embodiments, the query routing policy determines which search nodes a given query is routed based on a target upper bound number of queries each search node can handle concurrently, as well as which shards exist at each search node. In some embodiments, query routing policy component 112 accounts for less than the total number of nodes (e.g., the number determined by node component 108) to allow for the failure of one or more of the nodes. In some embodiments, query routing policy component 112 favors returning complete results over partial or incomplete results in the event of a node failure. In some embodiments, the query routing policy component 112 utilizes a modified maximum flow algorithm that includes an upper bound shard capacity.

Figure 2:
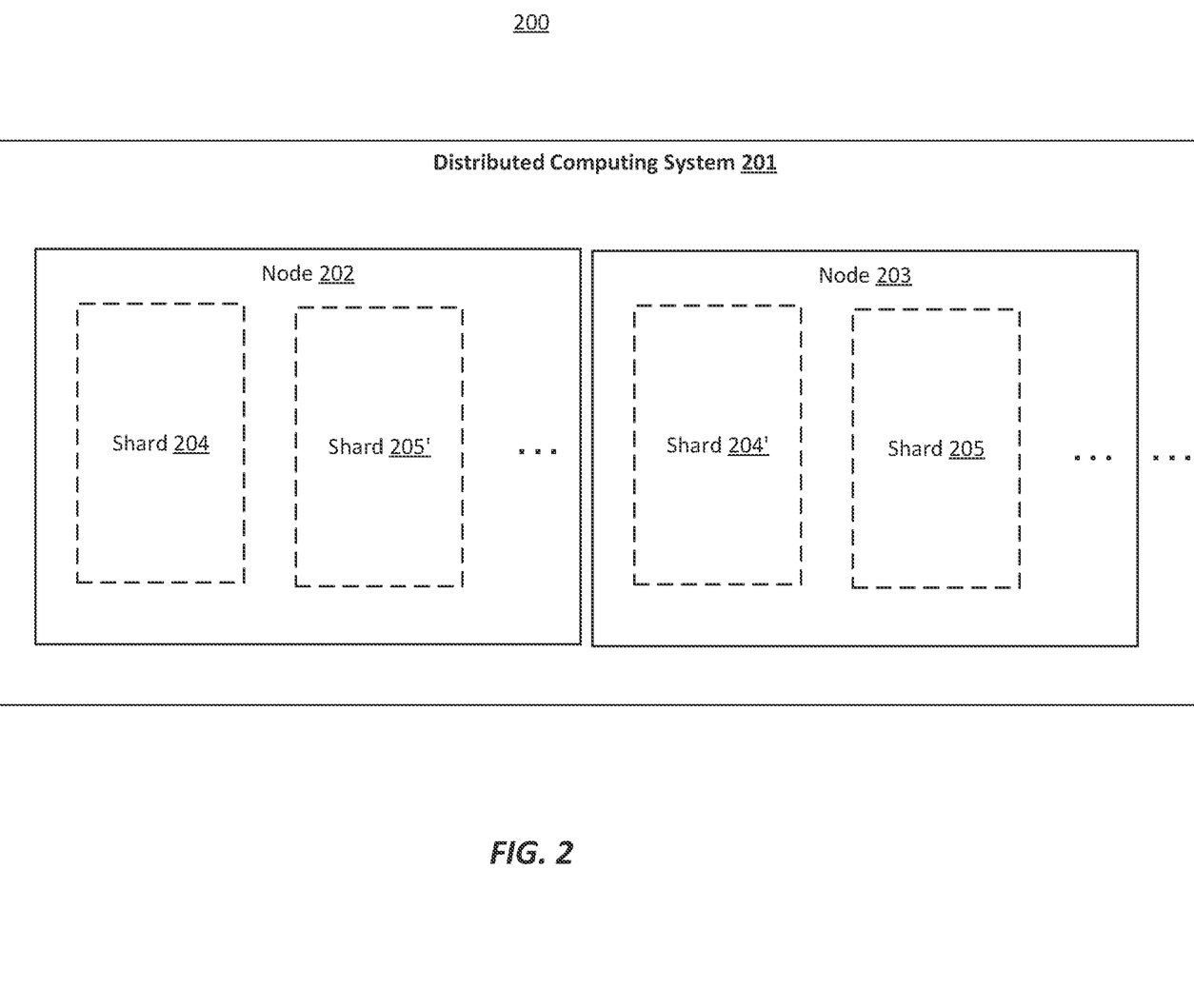
FIG. 2 illustrates an example of distributing an index over shards.

FIG. 2 illustrates an example 200 of a distributed computing system 201 implemented based on the components of computer architecture 100. As shown, distributed computing system 201 includes a plurality of nodes, with node 202 and node 203 illustrated as examples. Thus, in embodiments, node component 108 has determined that there are (or should be) two nodes (e.g., node 202 and 203) within distributed computing system 201. As indicated by ellipses, in other embodiments, node component 108 determines that distributed computing system 201 contains (or should contain) more than two nodes.

As shown in FIG. 2, node 202 includes a shard 204, and node 203 includes a shard 205. Additionally, node 202 includes a replica of shard 205, shown as shard 205', while node 203 includes a replica of shard 204, shown as shard 204'. Thus, shard component 109 has determined that there should be at least two shards per identified node, and index component 111 has distributed those shards to these two nodes. In some embodiments, each node (e.g., node 202 and node 203) includes exactly two different shards. In other embodiments, and as indicated by ellipses, each node (e.g., node 202 and node 203) includes more than two different shards. In some embodiments, the number of shards per node is the same. In other embodiments, the number of shards per node varies per node. Notably, in the arrangement shown in example 200 (e.g., in which node 202 contains shard 204 and shard 205' and node 203 contains shard 204' and shard 205), either node 202 or node 203 could fail while preserving the ability of distributed computing system 201 to produce complete query results.

Figure 3A:
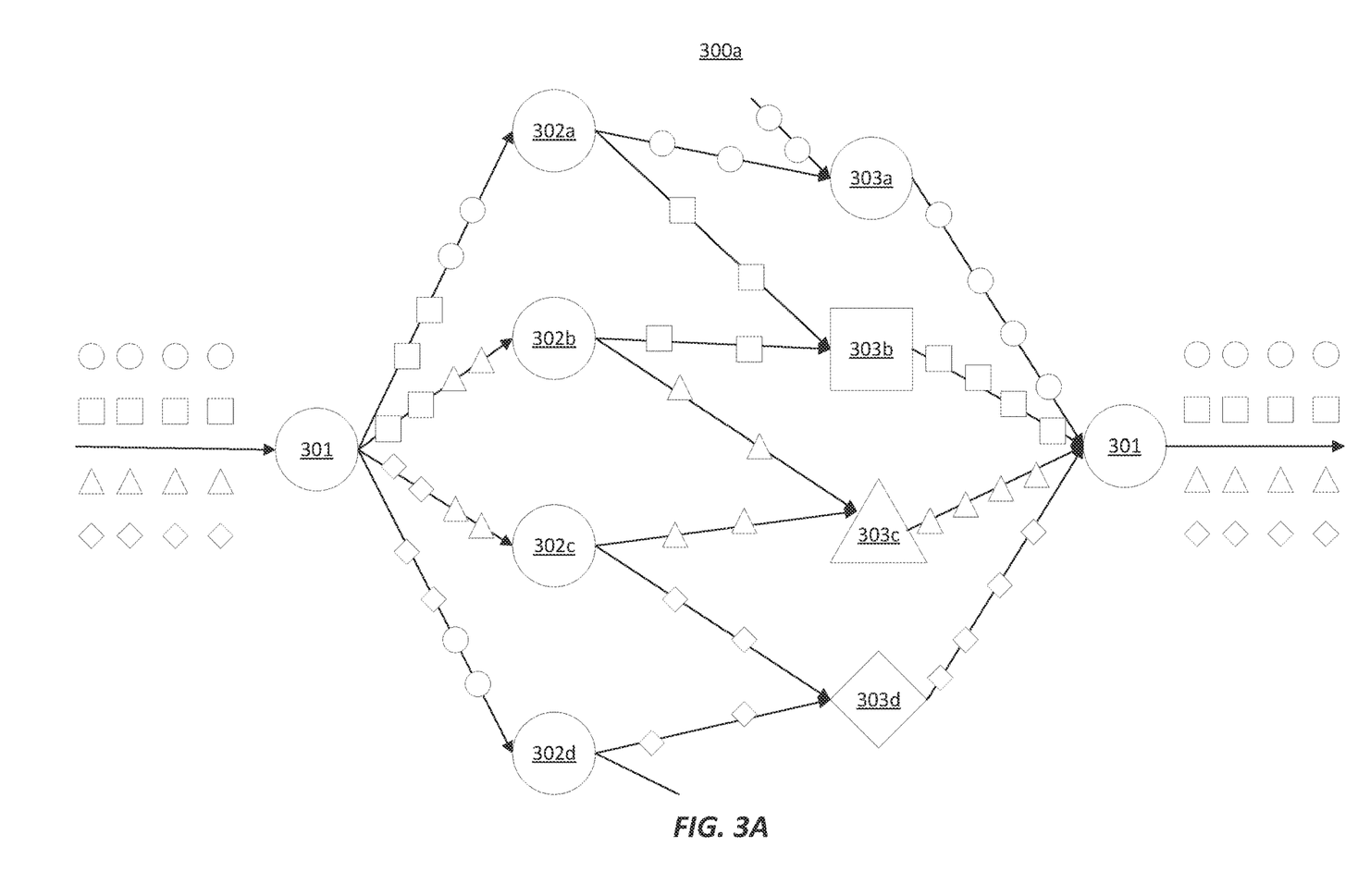
FIG. 3A illustrates an example query routing policy.
Figure 3B:
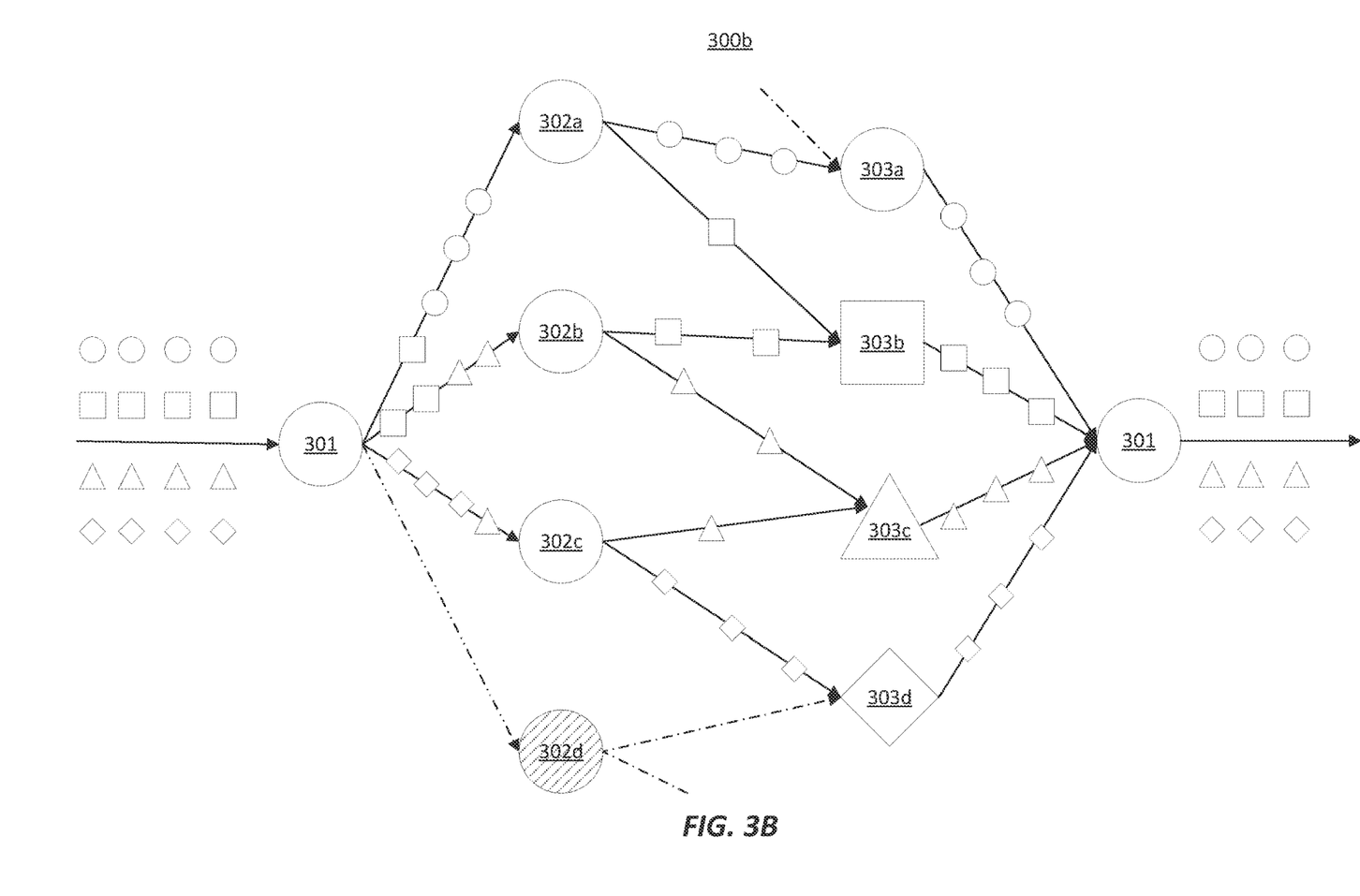
FIG. 3B illustrates an example query routing policy when a node becomes unavailable.

Turning now to details regarding processing a query, FIGS. 3A and 3B illustrate example schematics of receiving queries and returning results using computing system 101 and distributed computing system 201. FIG. 3A illustrates a system 300a, in which node component 108 has identified four nodes, nodes 302a-302d (collectively, nodes 302). Additionally, shard component 109 has created four distinct shards, including shard 303a (represented as a circle), shard 303b (represented as a square), shard 303c (represented as a triangle), and shard 303d (represented as a diamond). There are collectively referred to herein as shards 303.

In FIG. 3A, shards 303 are distributed to nodes 302 in distinct pairings. For example, arrows between node 302a and each of shards 303a and 303b indicate that each of shards 303a and 303b (e.g., circles and squares) are distributed to node 302a. Additionally, arrows between node 302b and each of shard 303b and 303c indicate that each of shard 303b and 303c (e.g., squares and triangles) are distributed to node 302b. Additionally, arrows between node 302c and each of shard 303c and 303d indicate that each of shard 303c and 303d (e.g., triangles and diamonds) are distributed to node 302c. Finally, arrows between node 302d and shards 303d and 303a indicate that each of shards 303d and 303a (diamonds and circles) are distributed to node 302d.

Notably, by distributing shards 303 across nodes 302 using these distinct pairings, it is possible for there to be some two-node failures that maintain full shard availability. For example, full shard availability is maintained with the failure of both nodes 302a and 302c or with the failure of both nodes 302b and 302d.

FIG. 3A further illustrates four requested queries sent to computing system 301. In system 300a, each query is represented by a column including a circle, a square, a triangle, and a diamond, indicating that each query needs to be processed against each shard of shards 303 for complete results. Thus, there are four query operations per query, and one query operation per shard. In embodiments, the particular node of nodes 302 to which each of these query operations is routed is based on the query routing policy identified by query routing policy component 112.

As shown in the example schematic of FIG. 3A, the query routing policy routes four query operations to node 302a, with two of the query operations being processed by node 302a against shard 303a (e.g., two circles along the line connecting computing system 301 with node 302a and along the line connecting node 302a with shard 303a) and two of the query operations being processed by node 302a against shard 303b (e.g., two squares along the line connecting computing system 301 with node 302a and along the line connecting node 302a with shard 303b). The query routing policy also routes four query operations to node 302b, with two of the query operations being processed by node 302b against shard 303b (e.g., two squares along the line connecting computing system 301 with node 302b and along the line connecting node 302b with shard 303b) and two of the query operations being processed by node 302b against shard 303c (e.g., two triangles along the line connecting computing system 301 with node 302b and along the line connecting node 302b with shard 303c). The query routing policy also routes the query operations to node 302c, with two of the query operations being processed by node 302c against shard 303c (e.g., two triangles along the line connecting computing system 301 with node 302c and along the line connecting node 302c with shard 303c) and two of the query operation being processed by node 302c against shard 303d (e.g., two diamonds along the line connecting computing system 301 with node 302c and along the line connecting node 302c with shard 303d). The query routing policy also routes four query operations to node 302d, with two of the query operations being processed by node 302d against shard 303d (e.g., two diamonds along the line connecting computing system 301 with node 302d and along the line connecting node 302d with shard 303d) and two of the query operations being processed by node 302d against shard 303a (e.g., two circles along the line connecting computing system 301 with node 302d and along the line connecting node 302d with shard 303a).

As shown in FIG. 3A, partial results corresponding to the query operations are sent back to the computing system 301 (or some other computer system), which aggregates those partial results to form four complete query results.

FIG. 3B illustrates a system 300b after node 302d in system 300a has failed and is unavailable. Similar to FIG. 3A, FIG. 3B illustrates four requested queries sent to computing system 301, where each query is represented by a column including a circle, square, triangle, and diamond, indicating that each query needs to be processed against each shard of shards 303 for complete results. Like in FIG. 3, the particular node of nodes 302 to which each of these query operations is routed is based on the query routing policy identified by query routing policy component 112. In this instance, due to the failure of node 302b, the query routing policy takes into account the failure of node 302d when routing these query operations.

As shown in the example schematic of FIG. 3B, the query routing policy routes four query operations to node 302a, with three of the query operations being processed by node 302a against shard 303a (e.g., three circles along the line connecting computing system 301 with node 302a and along the line connecting node 302a with shard 303a) and one of the query operations being processed by node 302a against shard 303b (e.g., one square along the line connecting computing system 301 with node 302a and along the line connecting node 302a with shard 303b). The query routing policy also routes the four query operations to node 302b, with two of the query operations being processed by node 302b against shard 303b (e.g., two squares along the line connecting computing system 301 with node 302b and along the line connecting node 302b with shard 303b) and two of the query operations being processed by node 302b against shard 303c (e.g., two triangles along the line connecting computing system 301 with node 302b and along the line connecting node 302b with shard 303c). The query routing policy also routes the four query operations to node 302c, with one of the query operations being processed by node 302c against shard 303c (e.g., one triangle along the line connecting computing system 301 with node 302c and along the line connecting node 302c with shard 303c) and three of the query operations being processed by node 302c against shard 303d (e.g., three diamonds along the line connecting computing system 301 with node 302c and along the line connecting node 302c with shard 303d).

Notably, the query routing policy has taken into account the failure of node 302d by routing three query operations to node 302a for processing against shard 303a (versus two, as was the case in FIG. 3) and by routing three query operations to node 302c for processing against shard 303d (versus two, as was the case in FIG. 3). In this example, the query routing policy prioritizes returning full results instead of partial results. As shown, with the failure of node 302d, system 300b has fully utilized node 302a, node 302b, and node 302c to simultaneously process three of the four requested queries. Thus, system 300*b* can run at 75% of its maximum capacity and sustain the load in the event of a single node failure. Notably, this is a significant improvement to the second example system described above (e.g., having four nodes with a single shard each), which would have wasted an entire node's processing capabilities and completed only two queries when faced with the failure of a single node. In embodiments, the query routing policy may include other priorities, such as emphasizing a total number of concurrently-processed results over full results per query. While FIG. 3B shows an example of one node failure, the query routing policy may take into account multiple node failures and respond accordingly.

Notably, query processing capacity becomes even better for larger clusters. For instance, a cluster with 32 nodes can use 96.8% of its capacity (i.e., 31/32) with a single node failure. Even multiple node failures can be handled resiliently. For instance, with 32 nodes and single replication (e.g., each shard exists twice within the cluster), the chance is just 6.5% (i.e., 2/31) that a two-node failure would result in incomplete query results.

Figure 4:
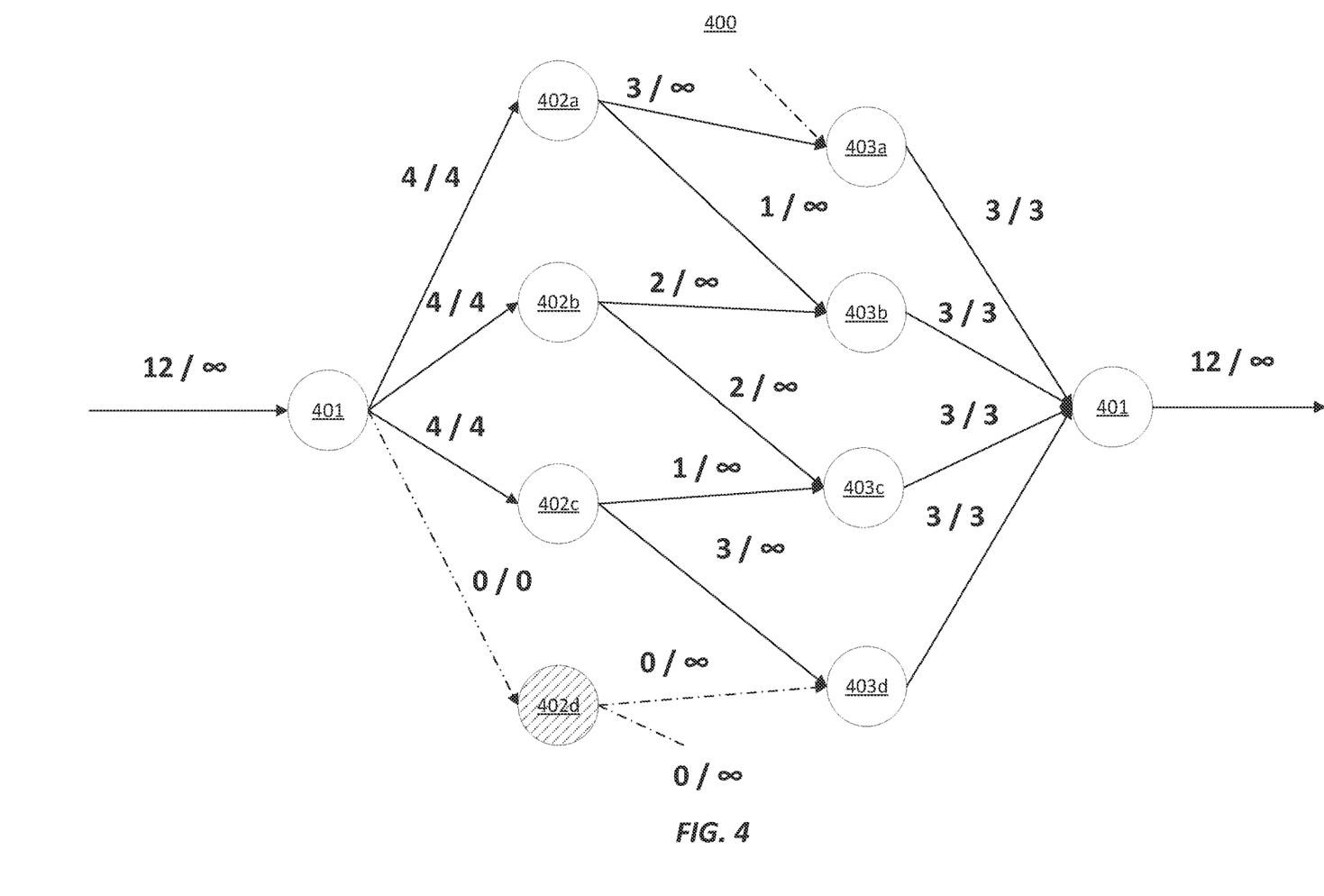
FIG. 4 illustrates an example query routing policy when a node becomes unavailable.

FIG. 4 illustrates a system 400 where search node 402*d* has failed and is unavailable, similar to FIG. 3B. In FIG. 4, the query routing policy is determined by a maximum flow algorithm shown as a max-flow graph where the first number (before the slash) represents the flow as determined by the maximum flow algorithm, and the second number represents the capacity which is given as input to the maximum flow algorithm and set as follows. As shown in FIG. 4, the capacity of each of search node 402*a*, 402*b*, and 402*c* is set to the number of requests they can handle per time unit, which is four in the example. The capacity of search node 402*d*, which has failed, is set to zero. In embodiments, shard capacity is set by an upper bound shard capacity, which is the number of search nodes multiplied by the capacity of each available node, with that product being divided by the number of shards. As shown in FIG. 4, the number of search nodes is three, the node capacity is four, and the number of distinct shards is four. This results in being able to process at most three full queries against each shard concurrently. Thus, the capacity of each of shard 403*a*, 403*b*, 403*c*, and 403*d* is set to three. All other capacities not mentioned above are set to infinity. Given these capacities, a maximum flow algorithm will then determine the first number shown in FIG. 4. These numbers define the query routing used by node 401 (e.g., which percentage of search requests are routed to which shard in order to maximize utilization).

Figure 5:
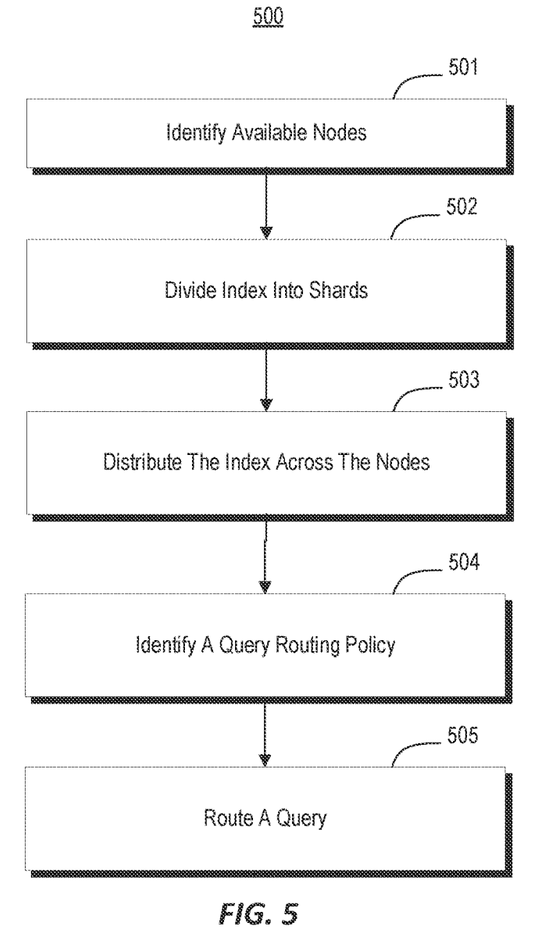
FIG. 5 illustrates a flow chart of an example method for load balancing.

FIG. 5 illustrates a flow chart of an example method 500, comprising acts of routing a query. In embodiments, instructions for implementing method 500 are encoded as computer-executable instructions (e.g., node component 108, shard component 109, index component 111, query routing policy component 112) stored on a computer storage media (e.g., storage media 107) that are executable by a processing system (e.g., processing system(s) 102) to cause a computer system (e.g., computing system 101) to perform method 500. The following discussion now refers to a number of methods and method acts. Although the method acts may be discussed in certain orders, or may be illustrated in a flow chart as occurring in a particular order, no particular ordering is required unless specifically stated, or required because an act is dependent on another act being completed prior to the act being performed.

In some embodiments, method 500 operates to route a query. Referring to act 501, node component 108 identifies available nodes. The number of nodes may be pre-determined by an administrator, user, or entity. In some embodiments, computing system 101 may determine the number of nodes based, e.g., on available computing resources. In other embodiments, the number of nodes may be a dynamic value that changes based on triggering events.

Referring to act 502, shard component 109 divides an index into shards. In some embodiments, each node contains at least two distinct shards. In other embodiments, each node contains exactly two distinct shards. In some embodiments, index component 111 indexes data 110. Referring now to act 503, index component 111 distributes the index shards across the nodes.

In some embodiments, act 501 comprises identifying n available nodes, while act 502 comprises dividing an index into m shards. In some embodiments, m is at least n*2. In other embodiments, m is n*2. In some embodiments, act 503 comprises distributing the index across the nodes, each node having at least two distinct shards.

Referring to act 504, policy component 112 identifies a query routing policy. In some embodiments, the identified query routing policy may be based on a target upper bound number of requests per node (e.g., based on node processing capability), as well as which shards exist at each node. Additionally, in some embodiments, the query routing policy accounts for n-i nodes where n is the number of nodes and i is a positive integer to allow for the failure of up to i of the n nodes.

In some embodiments, the query routing policy is a maximum flow algorithm that finds a feasible flow through a flow network (e.g., nodes 302 of system 300*a*) that obtains a maximum flow rate to emphasize complete results over partial results. In embodiments, the query routing policy is a maximum flow algorithm that includes an upper bound capacity of three queries per shard. In some embodiments, the upper bound shard capacity is n*j/m, where n is the number of nodes, j is the capacity of each node, and m is the number of shards. In some embodiments, the query routing policy is identified to favor returning the result as a complete result over a partial result. Thus, in some embodiments, act 504 comprises, based on a target upper bound number of requests per node and based on which shards exist at each node, identifying a query routing policy.

Referring to act 505, embodiments route a query. In some embodiments, computing system 101 receives a request for the query, and computing system 101 routes the query based on the query routing policy. In some embodiments, method 500 further includes returning the results of the query (e.g., by computing system 101 or some other computer system). In some embodiments, act 505 comprises routing a query based on the query routing policy.

Embodiments of the disclosure may comprise or utilize a special-purpose or general-purpose computer system (e.g., computing system 101) that includes computer hardware, such as, for example, a processor system (e.g., processing system(s) 102) and system memory (e.g., memory 103), as discussed in greater detail below. Embodiments within the scope of the present disclosure also include physical and other computer-readable media for carrying or storing computer-executable instructions and/or data structures. Such computer-readable media can be any available media that can be accessed by a general-purpose or special-purpose computer system. Computer-readable media that store computer-executable instructions and/or data structures are computer storage media (e.g., storage media 107). Computer-readable media that carry computer-executable instructions and/or data structures are transmission media. Thus, by way of example, embodiments of the disclosure can comprise at least two distinctly different kinds of computer-readable media: computer storage media and transmission media.

Computer storage media are physical storage media that store computer-executable instructions and/or data structures. Physical storage media include computer hardware, such as random access memory (RAM), read-only memory (ROM), electrically erasable programmable ROM (EEPROM), solid state drives (SSDs), flash memory, phase-change memory (PCM), optical disk storage, magnetic disk storage or other magnetic storage devices, or any other hardware storage device(s) which can be used to store program code in the form of computer-executable instructions or data structures, which can be accessed and executed by a general-purpose or special-purpose computer system to implement the disclosed functionality.

Transmission media can include a network and/or data links which can be used to carry program code in the form of computer-executable instructions or data structures, and which can be accessed by a general-purpose or special-purpose computer system. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer system, the computer system may view the connection as transmission media. Combinations of the above should also be included within the scope of computer-readable media.

Further, upon reaching various computer system components, program code in the form of computer-executable instructions or data structures can be transferred automatically from transmission media to computer storage media (or vice versa). For example, computer-executable instructions or data structures received over a network or data link can be buffered in RAM within a network interface module (e.g., network interface 104), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at one or more processors, cause a general-purpose computer system, special-purpose computer system, or special-purpose processing device to perform a certain function or group of functions. Computer-executable instructions may be, for example, binaries, intermediate format instructions such as assembly language, or even source code.

It will be appreciated that the disclosed systems and methods may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. Embodiments of the disclosure may also be practiced in distributed system environments where local and remote computer systems, which are linked (either by hardwired data links, wireless data links, or by a combination of hardwired and wireless data links) through a network, both perform tasks. As such, in a distributed system environment, a computer system may include a plurality of constituent computer systems. In a distributed system environment, program modules may be located in both local and remote memory storage devices.

It will also be appreciated that the embodiments of the disclosure may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). A cloud computing model can be composed of various characteristics, such as on-demand self-service, broad network access, resource pooling, rapid elasticity, measured service, and so forth. A cloud computing model may also come in the form of various service models such as, for example, Software as a Service (Saas), Platform as a Service (PaaS), and Infrastructure as a Service (IaaS). The cloud computing model may also be deployed using different deployment models such as private cloud, community cloud, public cloud, hybrid cloud, and so forth.

Some embodiments, such as a cloud computing environment, may comprise a system that includes one or more hosts that are each capable of running one or more virtual machines. During operation, virtual machines emulate an operational computing system, supporting an operating system and perhaps one or more other applications as well. In some embodiments, each host includes a hypervisor that emulates virtual resources for the virtual machines using physical resources that are abstracted from view of the virtual machines. The hypervisor also provides proper isolation between the virtual machines. Thus, from the perspective of any given virtual machine, the hypervisor provides the illusion that the virtual machine is interfacing with a physical resource, even though the virtual machine only interfaces with the appearance (e.g., a virtual resource) of a physical resource. Examples of physical resources including processing capacity, memory, disk space, network bandwidth, media drives, and so forth.

Although the subject matter has been described in language specific to structural features and/or methodological acts, it is to be understood that the subject matter defined in the appended claims is not necessarily limited to the described features or acts described above, or the order of the acts described above. Rather, the described features and acts are disclosed as example forms of implementing the claims.

The present disclosure may be embodied in other specific forms without departing from its essential characteristics. The described embodiments are to be considered in all respects only as illustrative and not restrictive. All changes which come within the meaning and range of equivalency of the claims are to be embraced within their scope.

When introducing elements in the appended claims, the articles "a," "an," "the," and "said" are intended to mean there are one or more of the elements. The terms "comprising," "including," and "having" are intended to be inclusive and mean that there may be additional elements other than the listed elements. Unless otherwise specified, the terms "set," "superset," and "subset" are intended to exclude an empty set, and thus "set" is defined as a non-empty set, "superset" is defined as a non-empty superset, and "subset" is defined as a non-empty subset. Unless otherwise specified, the term "subset" excludes the entirety of its superset (i.e., the superset contains at least one item not included in the subset). Unless otherwise specified, a "superset" can include at least one additional element, and a "subset" can exclude at least one element.

What is claimed:

1. A method, implemented at a computer system that includes a processor, comprising:
    identifying n available search node computer systems;
    dividing an index into m shards;
    distributing the index across the n available search node computer systems, including distributing a distinct set of at least two shards of the m shards to each search node computer system;
    receiving a query originating from a remote computer system;
    identifying a query routing policy for routing the query, the query routing policy identifying how to route queries among the search node computer systems based on, a maximum flow algorithm that determines an upper bound concurrent query capacity of each shard, calculated as $n*j/m$, where j is a target upper bound number of concurrent queries for each search node computer system, and
    which shards of the m shards exist at each search node computer system;
    routing the query among the search node computer systems based on the query routing policy, including routing a plurality of query operations among the search node computer systems, each query operation targeted to at least one shard; and
    after routing the query among the search node computer systems,
    aggregating a query result from partial results of the plurality of query operations; and
    returning the query result to the remote computer system.

2. The method of claim 1, wherein m is at least $n*2$.

3. The method of claim 2, wherein m is $n*2$.

4. The method of claim 1, wherein identifying the query routing policy includes accounting for n-i nodes, where i is a positive integer to allow for failure.

5. The method of claim 1, wherein the query routing policy is configured to favor returning the query result as a complete result over returning the query result as a partial result.

6. A computer system comprising:
    a hardware processor; and
    a computer storage media that stores computer-executable instructions that are executable by the hardware processor to at least:
    identify n available search node computer systems;
    divide an index into m shards, where m is at least $n*2$;
    distribute the index across the n available search node computer systems, including distributing a distinct set of at least two shards of the m shards to each search node computer system;
    receive a query originating from a remote computer system;
    identify a query routing policy for routing the query, the query routing policy identifying how to route queries among the search node computer systems based on, a maximum flow algorithm that determines an upper bound concurrent query capacity of each shard, calculated as $n*j/m$, where j is a target upper bound number of concurrent queries for each search node computer system, and
    which shards of the m shards exist at each search node computer system;
    route the query among the search node computer systems based on the query routing policy, including routing a plurality of query operations among the search node computer systems, each query operation targeted to at least one shard; and
    after routing the query among the search node computer systems,
    aggregate a query result from partial results of the plurality of query operations; and
    return the query result to the remote computer system.

7. The computer system of claim 6, wherein m is $n*2$.

8. The computer system of claim 6, wherein the query routing policy includes accounting for n-i nodes, where i is a positive integer to allow for failure.

9. The computer system of claim 6, wherein the query routing policy is configured to favor returning the query result as a complete result over returning the query result as a partial result.

10. The system of claim 6, wherein m is at least $n*2$.

11. A computer program product comprising a computer storage media that stores computer-executable instructions that are executable by a processor system to at least:
    identify n available search node computer systems;
    divide an index into m shards, where m is at least $n*2$;
    distribute the index across the n available search node computer systems, including distributing a distinct set of at least two shards of the m shards to each search node computer system;
    receive a query originating from a remote computer system;
    identify a query routing policy for routing the query, the query routing policy identifying how to route queries among the search node computer systems based on, a maximum flow algorithm that determines an upper bound concurrent query capacity of each shard, calculated as $n*j/m$, where j is a target upper bound number of concurrent queries for each search node computer system, and
    which shards of the m shards exist at each search node computer system;
    route the query among the search node computer systems based on the query routing policy, including routing a plurality of query operations among the search node computer systems, each query operation targeted to at least one shard; and
    after routing the query among the search node computer systems,
    aggregate a query result from partial results of the plurality of query operations; and
    return the query result to the remote computer system.

12. The computer program product of claim 11, wherein m is at least $n*2$.

13. The computer program product of claim 12, wherein m is $n*2$.

14. The computer program product of claim 11, wherein the query routing policy includes accounting for n-i nodes, where i is a positive integer to allow for failure.

15. The computer program product of claim 11, wherein the query routing policy is configured to favor returning the query result as a complete result over returning the query result as a partial result.

* * * * *